(12) United States Patent
Rene

(10) Patent No.: US 8,821,228 B1
(45) Date of Patent: Sep. 2, 2014

(54) DUAL BIN COMBINE SYSTEM

(71) Applicant: Anthony Duane Rene, Neche, ND (US)

(72) Inventor: Anthony Duane Rene, Neche, ND (US)

( * ) Notice: Subject to any disclaimer, the term of this patent is extended or adjusted under 35 U.S.C. 154(b) by 0 days.

(21) Appl. No.: 13/766,331

(22) Filed: Feb. 13, 2013

(51) Int. Cl.
*A01D 90/10* (2006.01)
*A01D 41/12* (2006.01)

(52) U.S. Cl.
CPC .................................. *A01D 41/1208* (2013.01)
USPC .............................. 460/23; 460/119; 280/838

(58) Field of Classification Search
USPC ............ 460/23, 114, 115, 119; 56/13.3, 16.6; 180/6.3, 6.48; 280/838
See application file for complete search history.

(56) References Cited

U.S. PATENT DOCUMENTS

| 3,110,521 | A | * | 11/1963 | Rogers et al. ................ 406/193 |
| 5,904,365 | A | * | 5/1999 | Dillon ........................... 280/419 |
| 6,632,135 | B2 | * | 10/2003 | Matousek et al. .............. 460/23 |
| 7,544,128 | B2 | * | 6/2009 | Van Vooren et al. .......... 460/114 |

* cited by examiner

*Primary Examiner* — Alicia Torres
(74) *Attorney, Agent, or Firm* — Jason L. Gilbert

(57) ABSTRACT

A dual bin combine system for combine harvesters which increases the storage capacity of harvested grain products when compared with previous systems. The dual bin combine system generally includes a combine harvester having a frame and a first tank for storing material harvested by the combine harvester. A frame extension, which extends in a rearward direction from the frame, includes a second tank. A transferring conduit extends from the first tank to the second tank. When operating the harvester, material may be fed from both tanks to reduce downtime unloading and thus more efficiently harvest crops.

9 Claims, 5 Drawing Sheets

DUAL BIN COMBINE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a storage system for a harvesting combine and more specifically it relates to a dual bin combine system for combine harvesters which drastically increases the storage capacity of harvested grain products when compared with previous systems.

2. Description of the Related Art

Any discussion of the related art throughout the specification should in no way be considered as an admission that such related art is widely known or forms part of common general knowledge in the field.

Combine harvesters have been in use for decades to harvest grains and other products after being cultivated in a farm or other setting. Generally, combine harvesters either dispense cultivated materials and byproducts by dropping on the ground for picking up later and/or feeding into a separately-driven tank vehicle. Further, combine harvesters having built-in storage tanks are often limited in volume and thus suffer from reduced time of operation between unloading.

Because of the inherent problems with the related art, there is a need for a new and improved dual bin combine system for combine harvesters which increases the storage capacity of harvested grain products when compared with previous systems.

BRIEF SUMMARY OF THE INVENTION

The invention generally relates to a dual bin combine system which includes a combine harvester having a frame and a first tank for storing material harvested by the combine harvester. A frame extension, which extends in a rearward direction from the frame, includes a second tank. A transferring conduit extends from the first tank to the second tank. When operating the harvester, material may be fed from both tanks to reduce downtime unloading and thus more efficiently harvest crops.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
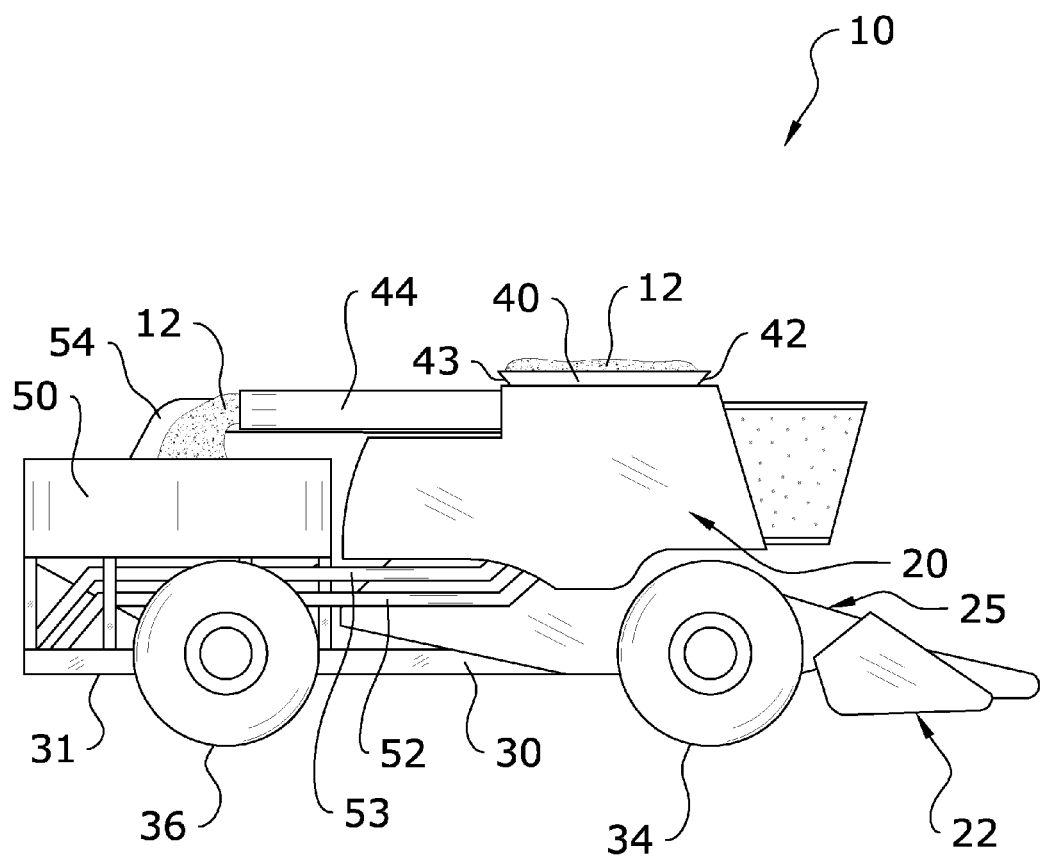
FIG. 1 is a first side view of the present invention.

Turning now descriptively to the drawings, in which similar reference characters denote similar elements throughout the several views, FIGS. 1 through 5 illustrate a dual bin combine system 10, which comprises a combine harvester 20 having a frame 30 and a first tank 40 for storing material harvested by the combine harvester 20. A frame extension, which extends in a rearward direction from the frame 30, includes a second tank 50. A transferring conduit 44 extends from the first tank 40 to the second tank 50. When operating the harvester 20, material may be fed from both tanks 40, 50 to reduce downtime unloading and thus more efficiently harvest crops.

B. Harvesting Combine

The present invention is comprised of a new configuration to be used in combination with harvesting combines 20. Harvesting combines 20 have been in use for many decades for harvesting grains and the like. Harvesting combines 20 generally perform numerous functions within one device, such as reaping, threshing and winnowing of grain crops.

Harvesting combines 20 include one or more combine heads 22 which are utilized to harvest various different types of crops. The combine heads 22, including one or more sickles 23, process and transfer the crop to an auger 24, where it is further processed and transferred to a processing member 25 or assembly, which acts to perform the various functions required to harvest grains and the like.

While the figures illustrate a specific design of a combine harvester 20, it is appreciated that the principles and structures of the present invention may be applied to a wide range of combine harvesters 20. Thus, the present invention should not be construed as being limited in application the exemplary design of a combine harvester 20 shown in the figures.

C. Frame and Frame Extension

Figure 4:
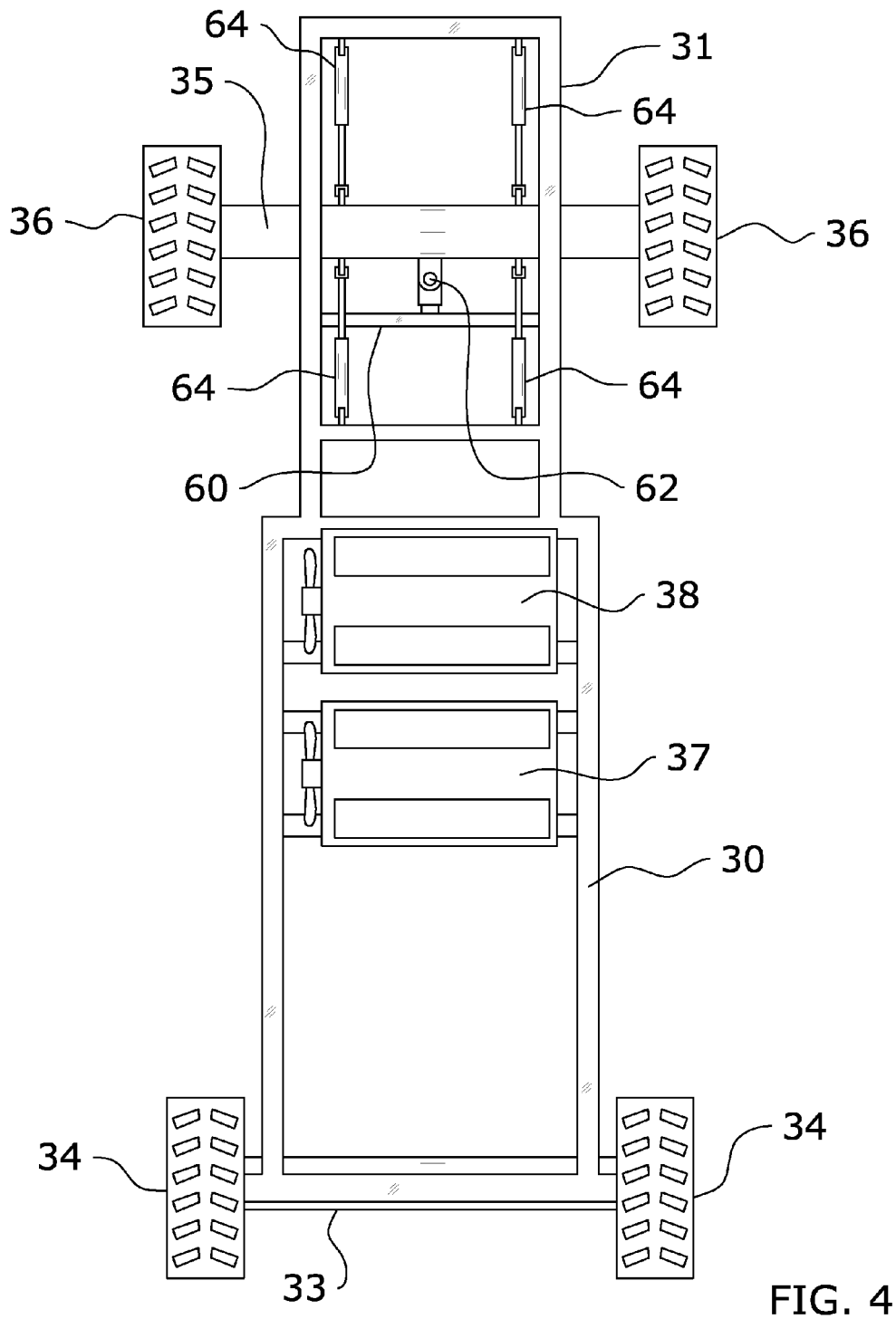
FIG. 4 is a top view of the frame and extended frame of the present invention.
Figure 5:
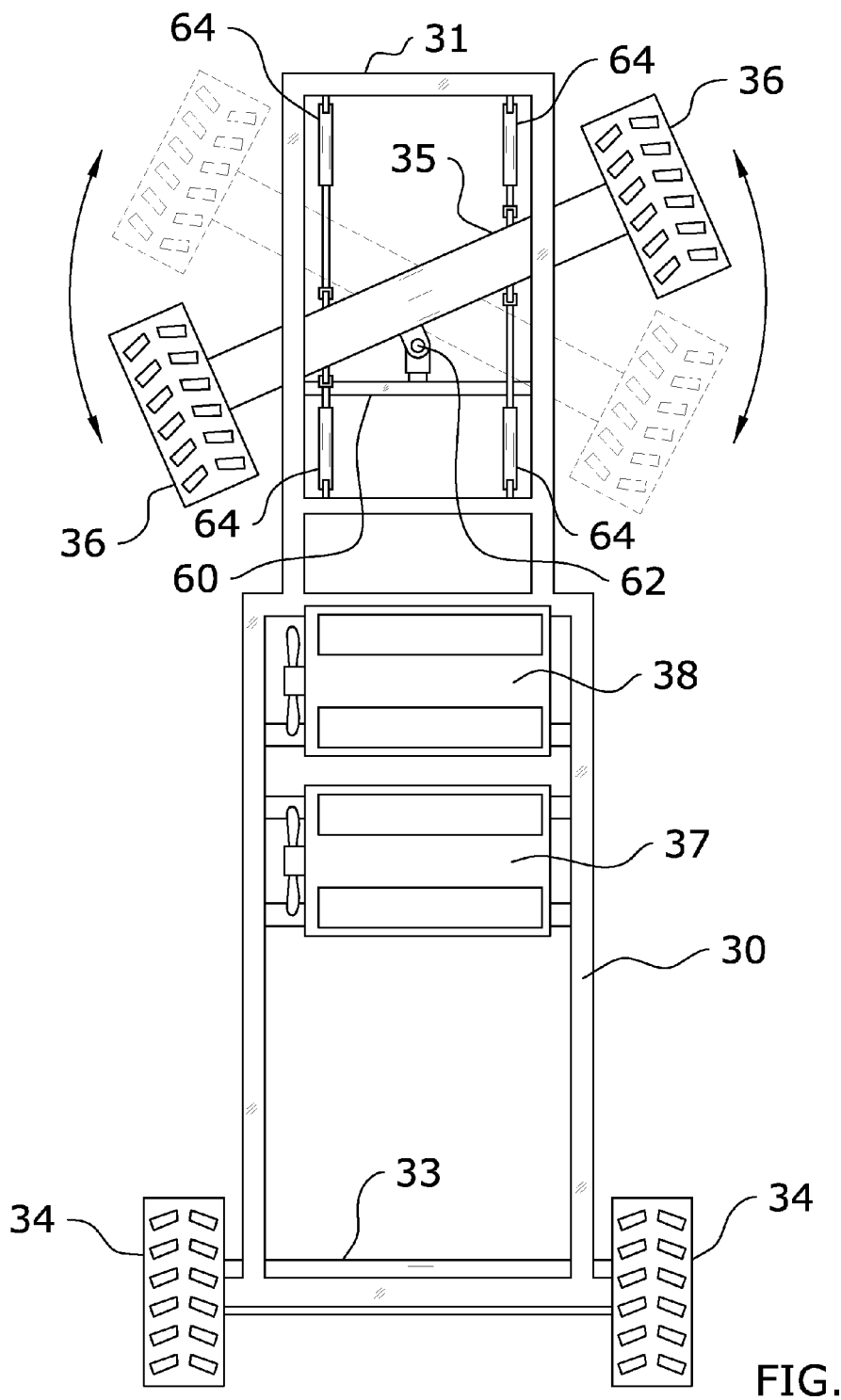
FIG. 5 is a top view of the frame and extended frame of the present invention illustrating motion of its front and rear wheels.

As best shown in FIGS. 4 and 5, the present invention comprises a frame 30 which forms an integral part of the harvesting combine 20 as well as an added frame extension 31 which, in combination with the harvesting combine's 20 frame 30, supports a pair of bins 40, 50 for storing harvested crop 12. It is appreciated that the frame 30 and frame extension 31 may be comprised of separate structures or may be integrally formed of a unitary structure as shown in the figures. In a preferred embodiment, the frame 30 will be comprised of a first width to accommodate the first tank 40 and the frame extension 31 will be comprised of a second width to accommodate the second tank 50.

As shown in FIG. 4, the frame 30 of the combine 20 includes a first axle 33 and the frame extension 31 includes a second axle 35. The first axle 33 includes a pair of front wheels 34 and the second axle 35 includes a pair of rear wheels 36. It is preferable to include the first axle 33 on the frame 30 and the second axle 35 on the frame extension 31 so as to more effectively distribute the weight of the filled tanks 40, 50 when the present invention is in use. However, it is appreciated that other configurations may be utilized.

Preferably, each of the axles 33, 35 will be driven by a pair of motors 37, 38. As shown in FIGS. 4 and 5, a first motor 37 and second motor 38 are positioned adjacent to each other to provide the power necessary to operate the present invention. The use of a pair of motors 37, 38 is preferable due to the added weight and power requirements caused by the second tank 50 and frame extension 31.

While the motors 37, 38 are illustrated as being mounted to the frame 30, it is appreciated that they may be located at various other locations on the body of the combine harvester 20. Similarly, it is appreciated that various types of motors 37, 38 may be utilized with the present invention.

As shown in FIG. 4, hydraulics 64 are utilized to control the second axle 35. A connector mount 60 extends across the frame extension 31 on which is mounted an axle connector 62. The axle connector 62 is comprised of a pivotable structure which pivotally secures the axle 35 to the connector mount 60. Bias members 64 such as hydraulic cylinders are utilized to control the axle 35 and wheels 36 as illustrated in FIGS. 4 and 5.

D. Storage Tanks

Figure 3:
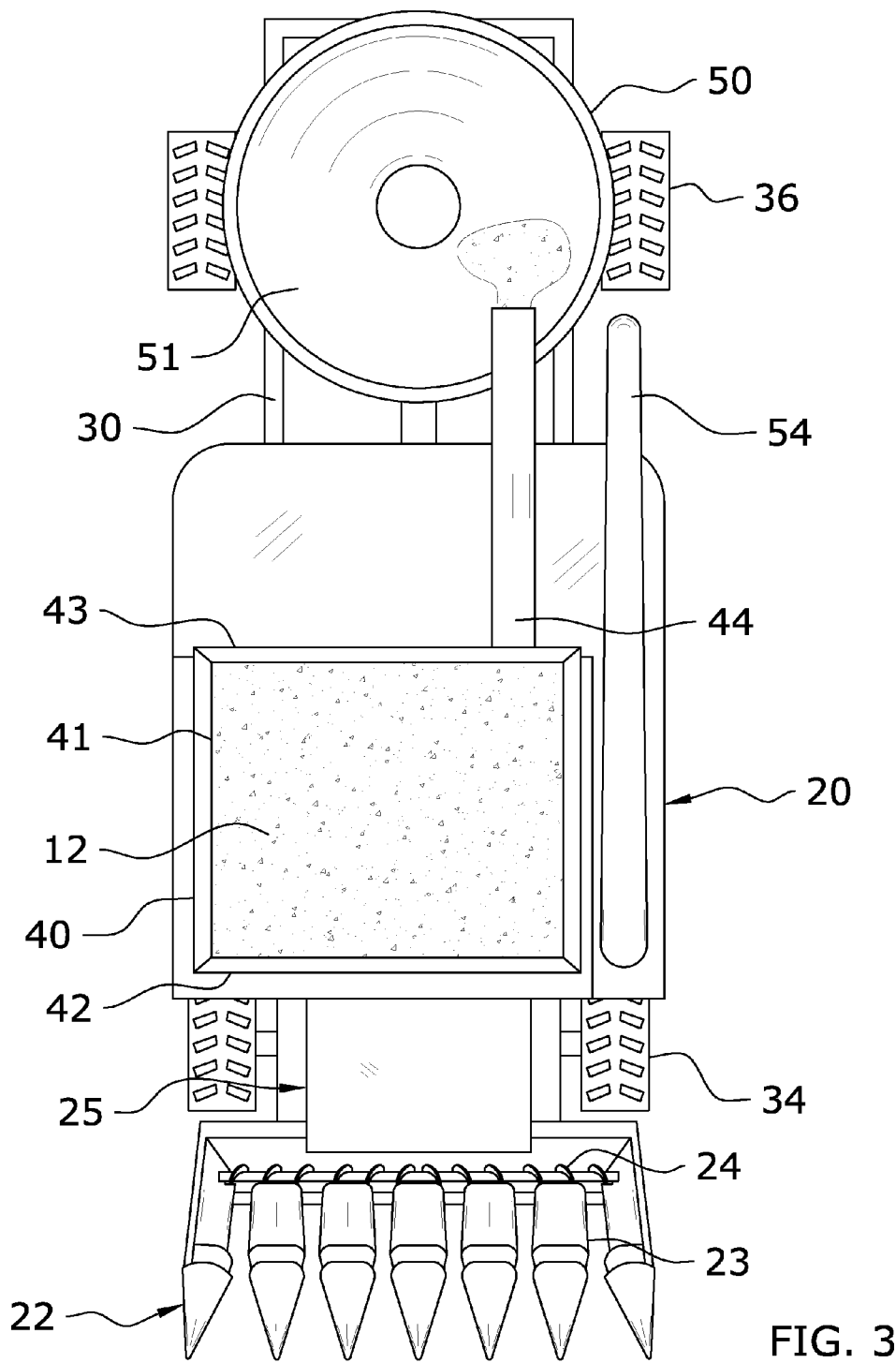
FIG. 3 is a top view of the present invention.

As shown in FIG. 3, the present invention generally includes a pair of tanks 40, 50 for storing harvested crop 12 and/or byproducts of operation of the combine harvester 20. Various configurations, sizes and placements of the tanks 40, 50 may be utilized, and thus the exemplary figures and descriptions of the present application should not be construed as being limiting on the scope of the invention unless expressly stated or claimed. For example, FIG. 3 illustrates usage of a square-shaped first tank 40 and a hopper-shaped second tank 50. It is appreciated that various other configurations may be utilized.

Figure 2:
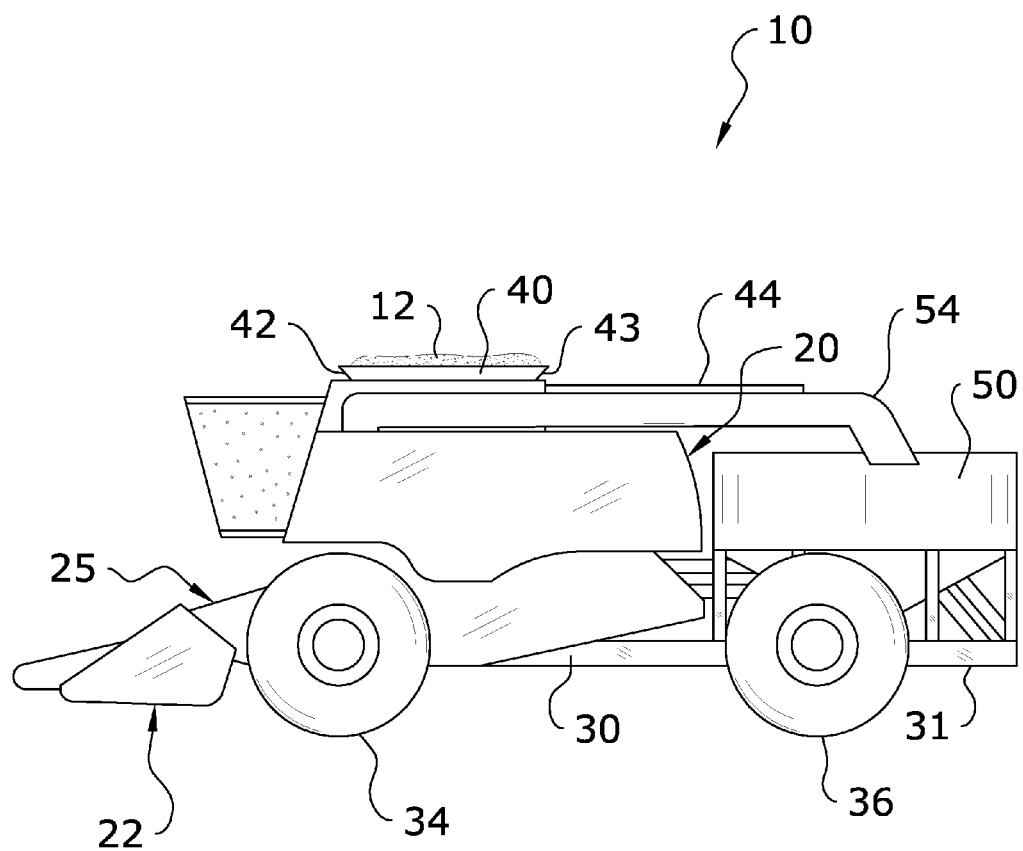
FIG. 2 is a second side view of the present invention.

The first tank 40 is generally a part of the native combine 20 and is generally supported by the frame 30 as shown in FIGS. 1-3. Matter is transferred directly from the processing assembly 25 of the combine harvester 20 into the first tank 40. The first tank 40 includes an upper opening 41, a front end 42 and a rear end 43. The first tank 40 is generally fed material from the processing assembly 25. Material is generally fed from the first tank 40 to the second tank 50 through its rear end 42.

Preferably, the present invention will include a transfer member 44 for transferring materials from the first tank 40 to the second tank 50. The transfer member 44 may be comprised of various conduits and the like which are capable of efficiently transferring a particulate material from one tank 40 to another 50. The transfer member 44 may be operated via an air-system or other transferring means.

A number of conduits 52, 53, 54 may also be utilized to aid in transferring materials. As shown in the figures, a first conduit 52, a second conduit 53 and a third conduit 54 may be included to aid in unloading the materials from the tanks 20, 50. In some embodiments, the third conduit 54 may swing out to allow for maneuverability when unloading.

The second tank 50 is generally supported by the frame extension 31 as shown in FIGS. 1-3. Matter is transferred directly from the first tank 40 into the second tank 50 via the transfer member 44. The second tank 50 includes an upper opening 51 through which material is deposited into the second tank 50 via the transfer member 44. The second tank 50, in a preferred embodiment, will be comprised of a hopper configuration as shown in the figures.

E. Operation of Preferred Embodiment

In use, the combine harvester 20 is operated as is customary in the art. Harvested crops and/or byproducts are transferred into the first tank 40 from the processing member 25. When the first tank 40 is near capacity, or upon demand from the operator of the present invention, the transfer member 44 may be activated to transfer some or all of the material into the first tank 40 from the second tank 50. When the tanks 40, 50 is reaching capacity, the second motor 38 may be utilized to more effectively maneuver under the weight of the filled tanks 40, 50.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A dual tank combine system, comprising:
   a combine harvester;
   a frame secured to said combine harvester, wherein said frame includes a first portion and a second portion, wherein said first portion and said second portion are integrally formed;
   wherein said first portion of said frame includes a front axle and wherein said second portion of said frame includes a rear axle;
   a first motor for powering said front axle;
   a second motor for powering said rear axle;
   a connector mount extending across said second portion of said frame, wherein said rear axle is pivotally secured to said connector mount;
   a plurality of hydraulic bias members connected between said second portion of said frame and said rear axle for pivoting said rear axle;
   a first tank mounted on said first portion of said frame; and
   a second tank mounted on said second portion of said frame.

2. The dual tank combine system of claim 1, wherein said second tank is comprised of a hopper.

3. The dual tank combine system of claim 1, further comprising a transfer member extending from said first tank to said second tank.

4. The dual tank combine system of claim 3, wherein said transfer member is comprised of a conduit.

5. The dual tank combine system of claim 4, wherein said transfer member is air-driven.

6. The dual tank combine system of claim 1, wherein said front axle is controlled independently of said rear axle.

7. The dual tank combine system of claim 1, wherein said plurality of hydraulic bias members comprises a first hydraulic bias member connected between a first side of said rear axle and said second portion of said frame and a second hydraulic bias member connected between a second side of said rear axle and said second portion of said frame.

8. The dual tank combine system of claim 1, wherein said first motor and said second motor are positioned side-by-side on said first portion of said frame.

9. The dual tank combine system of claim 1, wherein said first portion is comprised of a first width and wherein said second portion is comprised of a second width, wherein said second portion is wider than said first portion.

\* \* \* \* \*